US012429938B2

United States Patent
Murthy

(10) Patent No.: US 12,429,938 B2
(45) Date of Patent: Sep. 30, 2025

(54) FACILITATING A SCHEDULER FOR DISTRIBUTED UNIT POWER MANAGEMENT IN ADVANCED COMMUNICATION NETWORKS

(71) Applicant: Dell Products, L.P., Round Rock, TX (US)

(72) Inventor: Prashanth Murthy, Plano, TX (US)

(73) Assignee: Dell Products L.P., Round Rock, TX (US)

( * ) Notice: Subject to any disclaimer, the term of this patent is extended or adjusted under 35 U.S.C. 154(b) by 122 days.

(21) Appl. No.: 18/473,599

(22) Filed: Sep. 25, 2023

(65) Prior Publication Data

US 2025/0103123 A1    Mar. 27, 2025

(51) Int. Cl.
  *G06F 1/00*    (2006.01)
  *G06F 1/3209*  (2019.01)
  *G06F 1/3287*  (2019.01)

(52) U.S. Cl.
  CPC .......... *G06F 1/3209* (2013.01); *G06F 1/3287* (2013.01)

(58) Field of Classification Search
  CPC .............................. G06F 1/3209; G06F 1/3287
  See application file for complete search history.

(56) References Cited

U.S. PATENT DOCUMENTS

| | | | |
|---|---|---|---|
| 9,432,901 B1* | 8/2016 | Kwan | H04L 41/147 |
| 12,126,458 B1* | 10/2024 | Pillai | H04L 43/20 |
| 2011/0296212 A1* | 12/2011 | Elnozahy | G06F 1/3203 |
| | | | 713/320 |
| 2016/0113050 A1 | 4/2016 | Li et al. | |
| 2016/0255630 A1 | 9/2016 | Etemad | |
| 2019/0132836 A1 | 5/2019 | Li et al. | |
| 2022/0066487 A1* | 3/2022 | Khlat | G05F 1/46 |
| 2024/0187983 A1* | 6/2024 | Xue | H04W 52/0206 |
| 2024/0429716 A1* | 12/2024 | Sharif-Askary | G06N 3/09 |

OTHER PUBLICATIONS

International Search Report and Written Opinion received for PCT Application Serial No. PCT/US2024/013720 dated Jun. 5, 2024, 14 pages.

* cited by examiner

*Primary Examiner* — Xuxing Chen
(74) *Attorney, Agent, or Firm* — Amin, Turocy & Watson, LLP

(57) ABSTRACT

Facilitating a scheduler for distributed unit power management in advanced communication networks is provided herein. A method includes, based on a processing load of a group of core processors being determined to be below a threshold traffic amount for a first transmission time slot, selecting, by network equipment comprising a processor, a core processor of the group of core processors for power management, resulting in an identified core processor. Selection of the core processor can be based on a configuration of the identified core processor. The method also includes, based on a category assigned to the identified core processor, controlling, by the network equipment, a power consumption of the identified core processor during a second transmission time slot. The network equipment comprises a distributed unit, and controlling the power consumption is performed in a layer 2 scheduler of the distributed unit.

20 Claims, 9 Drawing Sheets

| Profile | Load | Min Core Frequency (Hz) | Max Core Frequency (Hz) | Min Uncore Frequency (Hz) | Max Uncore Frequency (Hz) |
|---|---|---|---|---|---|
| FDD 20 MHz 4x4 MIMO | High | 2G | 2G | 1.6G | 1.6G |
| | Medium | 1G | 1G | 1G | 1G |
| | Low | 800M | 800M | 800M | 800M |
| TDD 100 MHz 4x4 MIMO | High | 2.5G | 2.5G | 1.6G | 1.6G |
| | Medium | 2.2G | 2.2G | 1.6G | 1.6G |
| | Low | 2G | 2G | 1.4G | 1.4G |

FIG. 2

FACILITATING A SCHEDULER FOR DISTRIBUTED UNIT POWER MANAGEMENT IN ADVANCED COMMUNICATION NETWORKS

BACKGROUND

The use of computing devices is ubiquitous. Given the explosive demand placed upon computing networks and the advent of advanced use cases (e.g., streaming, gaming, and so on), the amount of data consumed continues to increase with a corresponding increase to the power consumption of a server. Several mechanisms to reduce the power consumption of a server have been used and work well during extended low activity periods but cannot be applied to short inactivity periods and/or during other times due to the latency impacts and down time. Accordingly, unique challenges exist related to power consumption management and in view of forthcoming Fifth Generation (5G), New Radio (NR), Sixth Generation (6G), or other next generation, standards for network communication.

The above-described context with respect to communication networks is merely intended to provide an overview of current technology and is not intended to be exhaustive. Other contextual descriptions, and corresponding benefits of some of the various non-limiting embodiments described herein, will become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, a method is provided that includes, based on a processing load of a group of core processors being determined to be below a threshold traffic amount for a first transmission time slot, selecting, by network equipment comprising a processor, a core processor of the group of core processors for power management, resulting in an identified core processor. Selection of the core processor can be based on a configuration of the identified core processor. The method also includes, based on a category assigned to the identified core processor, controlling, by the network equipment, a power consumption of the identified core processor during a second transmission time slot. The network equipment comprises a distributed unit, and controlling the power consumption is performed in a layer 2 scheduler of the distributed unit.

In an implementation, controlling the power consumption can include controlling a layer 2 core of the distributed unit. According to some implementations, controlling the power consumption can include controlling a layer 1 core of the distributed unit. In another implementation, controlling the power consumption can include controlling a layer 1 protocol of a computing entity separate from the core of the distributed unit. According to some implementations, controlling the power consumption can include transitioning a mode of the identified core processor from an active mode to a sleep mode.

In some implementations, controlling the power consumption can include, at an end of scheduling for a transmission time slot and based on a processing load for the transmission time slot, determining a first state control parameter and a second state control parameter. Based on determining the first and second state control parameters, the method can include instructing respective threads to perform a power saving action for the identified core processor.

According to some implementations, prior to controlling the power consumption, the method can include provisioning, by the network equipment, respective power management profiles for distributed unit instances of the identified core processor via an O1 interface. The provisioning can be based on use of a statistical model to implement the control of the power consumption. In some implementations, selecting the core processor can be performed after the first transmission time slot. Further to these implementations, the method can include determining, by the network equipment, a frequency assignment for a next scheduled slot following the first transmission time slot. Determination of the frequency assignment can be based on information obtained from a data structure that comprises a group of recommended frequencies based on the processing load, and a profile of the identified core processor.

The method can include, according to some implementations, provisioning, by the network equipment, respective power management profiles for distributed unit instances of the identified core processor via an E2 interface. The provisioning can be performed prior to controlling the power consumption and can be based on use of a machine learning model to implement the power consumption control. Further, the machine learning model can be trained based on historical data representative of past power management settings.

In an example, the category assigned to the identified core processor is determined to be one from a defined group of categories, comprising: a first category associated with a polling level 1 core, a second category associated with a non-polling level 1 core, a third category associated with a polling level 2 core, and a fourth category associated with a non-polling level 2 core. In another example, the processing load of the group of core processors changes intermittently due to sporadic traffic patterns.

Another embodiment relates to a system that includes a processor and a memory that stores executable instructions that, when executed by the processor, facilitate performance of operations. The operations include determining that a processing load of a group of core processors is below a defined threshold processing load amount for a first transmission time slot. The operations also include selecting at least one core processor from the group of core processors for power management. Selection of the at least one core processor is based on a configuration of the at least one core processor. Further, the operations include controlling power consumption by the at least one core processor during a second transmission time slot. Controlling the power consumption is based on a category assigned to the at least one core processor.

In some implementations, controlling the power consumption can be performed in medium access control scheduler of a distributed unit. In some implementations, controlling the power consumption can include controlling a layer 2 core of the distributed unit. According to some implementations, controlling the power consumption can include controlling a layer 1 protocol associated with a layer 1 core of the distributed unit.

According to some implementations, prior to controlling the power consumption and based on use of a statistical model to implement the control, the operations can include provisioning respective power management profiles for distributed unit instances of the at least one core processor via an O1 interface. Further to these implementations, the operations can include determining a frequency assignment for a next scheduled slot based on information obtained from a data structure that comprises a group of recommended frequencies based on the processing load, and a profile of the at least one core processor.

In accordance with some implementations, prior to controlling the power consumption and based on use of a machine learning model to implement the control, the operations can include provisioning respective power management profiles for distributed unit instances of the at least one core processor via an E2 interface.

In some implementations, prior to controlling the power consumption, the operations can include determining the category assigned to the at least one core processor. Determination of the category assigned to the at least one core processor can include determining the category to be a polling level 1 core category, a non-polling level 1 core category, a polling level 2 core category, or a non-polling level 2 core category.

Another embodiment relates to a non-transitory machine-readable medium, comprising executable instructions that, when executed by a processor of network equipment, facilitate performance of operations. The operations can include, based on a processing load of a group of core processors during a first time slot being determined to be below a threshold traffic amount, selecting a core processor of the group of core processors for power management, resulting in an identified core processor. Selection of the core processor can be based on a configuration of the identified core processor. Further, the operations can include, based on a category assigned to the identified core processor, controlling, via a layer 2 scheduler of the distributed unit, a power consumption of the identified core processor during a second time slot. According to some implementations, controlling the power consumption can include controlling a layer 1 protocol associated with a layer 1 core of the distributed unit.

To the accomplishment of the foregoing and related ends, the disclosed subject matter includes one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which:

FIG. 2 illustrates an example of a statistical model configured via an O1 interface in accordance with one or more embodiments described herein;

DETAILED DESCRIPTION

Figure 1:
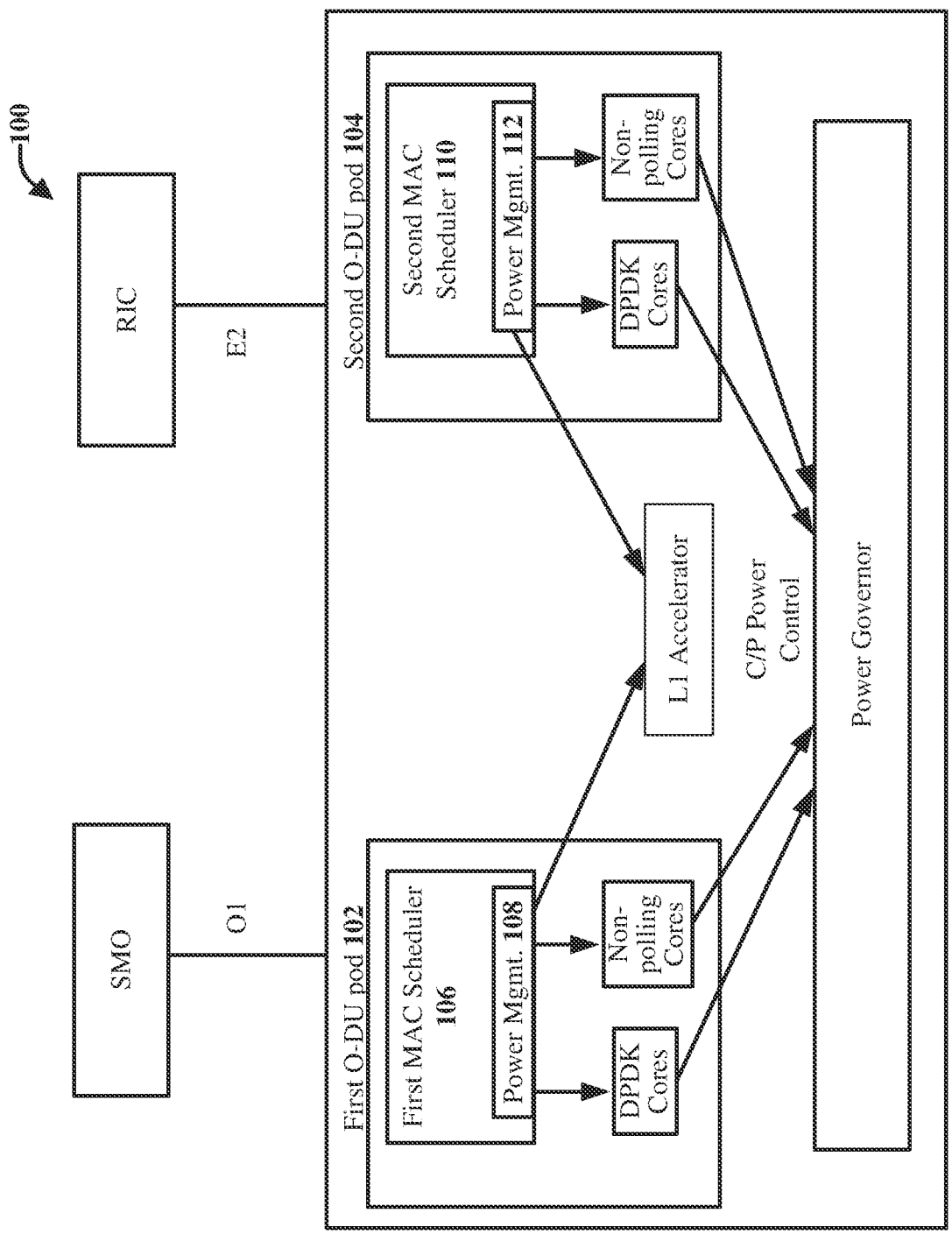
FIG. 1 illustrates an example, non-limiting, system that includes a scheduler in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

Conventional Central Processing Units (CPUs) can provide several mechanisms to reduce the power consumption of a server. However, the opportunity to make effective use of such CPUs reduces when the server hosts low-latency applications due to the performance impacts. However, some mechanisms that can be used to overcome this include so-called C-states and P-states.

The various C-states (e.g., power states) include active states and idle states. The power states include a C0 state, which is an operating state. The idle states are states entered by a CPU core when it enters sleep mode due to a pending Input/Output (I/O) operation or an application-initiated sleep. The idle or sleep states include a C1 state (e.g., a Halt state) and a C6 state (e.g., a deep sleep state).

The server offerings are targeted for 5G-NR Distributed Unit (DU/gNB-DU/O-DU) deployments that make extensive use of these processors. C-states can be managed by the CPUIdle subsystem of a kernel and can make use of privileged instructions, such as, MWAIT/MONITOR/PAUSE. There are also additional sub-states, referred to as C0.1 and C0.2 that can be provisioned from userspace using instructions, such as, for example, UMWAIT/UMONITOR/TPAUSE.

P-states, also known as Performance States, are operating points of a core with specific frequency and voltage level for instruction execution. Lower P-states result in lower operating frequency and voltage resulting in power savings at the cost of execution speed and, therefore, performance. The CPUFreq subsystem of the kernel allows frequency scaling through a power governor triggered via the Operating System (OS) virtual file system. Additionally, the DPDK rte_power library provides routines to manage core frequencies from within an application.

DPDK (Data Plane Development Kit) is a set of open-source user space libraries used in low-latency and fast packet processing applications. There is a range of libraries available for NICs (Network Interface Cards), accelerators, and CPU power management from various sources (e.g., vendors). There are also generic ones to handle memory management, synchronization, and telemetry making it ideal for real-time applications, such as the DU.

A low-latency application, such as the DU, can make use of the C1 sleep state since a core can exit out of sleep and become active in a very short time. However, the average exit latency from a deeper sleep in the C6 state is in the order of 50-60 μs (microseconds), with worst-case exceeding 100 μs. This is much higher than the OFDM symbol duration, making it impracticable for a DU. The C1 state does provide some power savings but not as much power savings as the C6 state. Moreover, these states are controlled by the power governor and the application can only invoke them indirectly with a call to the library function usleep( ). For some packet processing cores that are always polling, it is not possible to go into the C1 state since this would lead to packet drops. The C0.1 and C0.2 sub-states are more suitable in this case, but this needs tight application control. Therefore, there are multiple control points for polling and non-polling threads that need coordination for optimal usage of C-states.

Frequency scaling for P-states is controlled by the kernel, but the userspace application can also make use of certain libraries to set the maximum and minimum frequencies. In this case as well, there are multiple control points, since polling cores can use DPDK libraries, but the non-polling cores can execute a frequency change only through the power governor.

There are other power saving methods such as core reduction, carrier scaling, and shutting down servers during off-peak hours. All of these power savings methods work well during extended low activity periods but cannot be applied to short inactivity periods during other times due to the latency impacts and down time.

Based on these observations, an effective and coordinated use of power control is needed for optimal power savings. However, the current implementations rely on the platform or infrastructure layer (Kubernetes/VMM) to leverage these processor features and the application is agnostic to these details. Since the platform layer does not have an application-level view, it is not the ideal component to handle this functionality.

The disclosed embodiments provide enhancements to the Layer 2 (L2) scheduler to include power management of the L2 and Layer 1 (L1) cores of the DU. The scheduler has the complete view of the processing load and can take appropriate decisions with finer granularity to coordinate power control. It is noted that L1 and L2, as utilized herein, relate to the gNB-DU Layer 1 and Layer 2 protocols (e.g., layer 1 (PHY) and layer 2 (MAC) protocols).

FIG. 1 illustrates an example, non-limiting, system 100 that includes a scheduler in accordance with one or more embodiments described herein. The system 100 of FIG. 1 depicts a high-level view of a distributed unit (DU) server with two containerized Open RAN DUS (O-DUs), illustrated as a first O-DU 102 and a second O-DU 104, although more than two O-DUs can be utilized with the disclosed embodiments. Further, although discussed with respect to O-Dus, the disclosed embodiments are not limited to this implementation and other types of disaggregated architecture can be utilized.

Each O-DU (e.g., the first O-DU 102, the second O-DU 104) includes an instance of the L2 scheduler incorporating its own power management module. Accordingly, the first O-DU 102 includes a first scheduler 106 and a first power management module 108, and the second O-DU 104 includes a second scheduler 110 and a second power management module 112. The modules have respective interfaces to both L1 and L2 processing entities (software threads or accelerated components). As illustrated, a Layer 1 (L1) Accelerator 114 interacts with the first power management module 108 and the second power management module 112 in the respective schedulers.

The scheduler (e.g., the first scheduler 106, the second scheduler 110) in each O-DU instance controls the power management functionality of the cores that are assigned to the pod. The cores are classified into the following four groups and each of them are handled differently based on their processing needs: (1) Polling L1 DPDK cores, (2) Non-polling L1 cores pooled for High-PHY processing, (3) Polling L2 DPDK cores, and (4) Non-polling L2 cores pooled for MAC/RLC and F1 processing.

At the end of scheduling for each slot, the scheduler determines the power consumption can be controlled based on the load for that slot and instructs each thread to perform a power saving action for that core. In an example, the power control can be a C-state power control and/or a P-state control, however, the disclosed embodiments are not limited to this specific example. Further to this example, for groups 1 and 3, TSC counter for the UMWAIT/TPAUSE instruction based on the calculated sleep duration for C0.1/C0.2 states. For all groups, the scaled core and uncore frequency that meets the latency and CPU utilization budget for the traffic profile is determined for the power control parameters.

Based on these instructions, the thread or accelerator component requests the power governor to take appropriate action on its behalf to enter a suitable power control state. A generic Scheduler-L1 interface is defined to accommodate any L1 acceleration implementation that can use its own power control based on inputs, such as sleep duration, and silicon-specific parameters, such as clock frequency.

The power management profile for each O-DU instance is provisioned via one of the following interfaces: (1) O1 interface for a statistical model and (2) E2 interface for a ML model.

The profile consists of the minimum and maximum core/uncore frequencies for low, medium and high load derived based on O-DU configuration. An O-DU instance for a mid-band frequency carrier with numerology 1 and slot duration 500 us has a different configuration compared to low-band with numerology 0 and slot duration 1 ms (millisecond). A scheduler implementation could use this as a look-up table for fast access to determine the frequency for the next slot scheduled. An example of a statistical model configured via the O1 interface is shown in the table of FIG. 2. The table 200 depicts respective results for two profiles, namely a FDD 20 MHz 4×4 MIMO and a TDD 100 MHz 4×4 MIMO.

A profile derived using a machine learning model and configured via the E2 interface would have more frequencies in 100 MHz (Megahertz) bins, which is the granularity of one or more power control states. Additionally, the profile can include silicon-specific parameters for accelerated L1.

Figure 3:
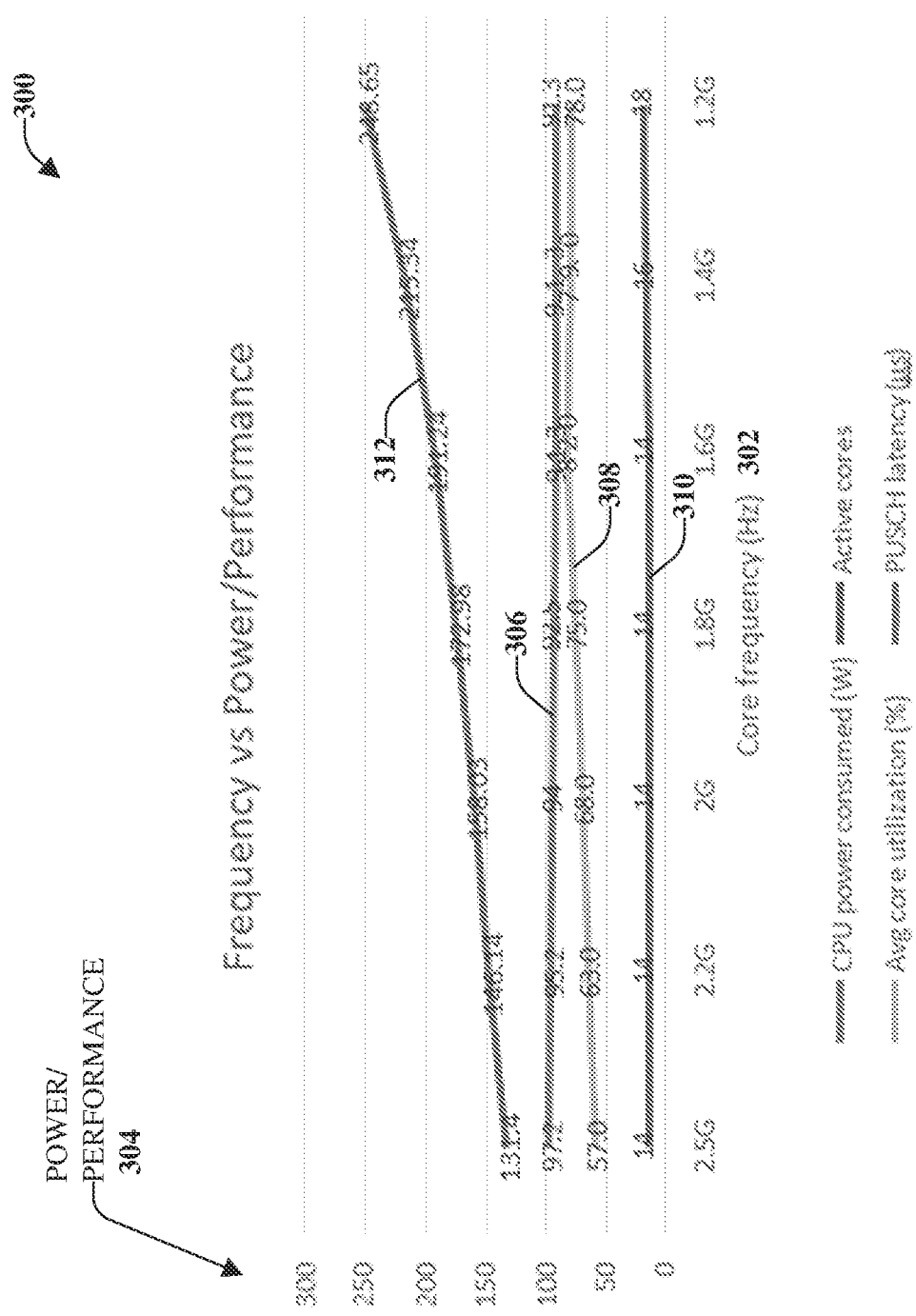
FIG. 3 illustrates a plot of frequency versus power for a 12-cell FDD 20 MHz distributed unit instance in accordance with one or more embodiments described herein.

The following results from a non-limiting experiment of a server with an CPU show the power saving achieved by frequency scaling of cores when the traffic is reduced by half. This example shows only core group 2 (Non-polling L1 cores). FIG. 3 illustrates an example, non-limiting, chart 300 of FDD 20 MHz cells with 100% PRB utilization. Core frequency 302 (in Hz) is represented on the horizontal axis and power/performance 304 is represented on the vertical axis. FIG. 3 shows the plot of frequency versus power for a 12-cell FDD 20 MHz DU instance. First line 306 represents the CPU power consumed (W), second line 308 represents the average core utilization (%), third line 310 represents the active cores, and fourth line 312 represents the PUSCH latency (μs).

Figure 4:
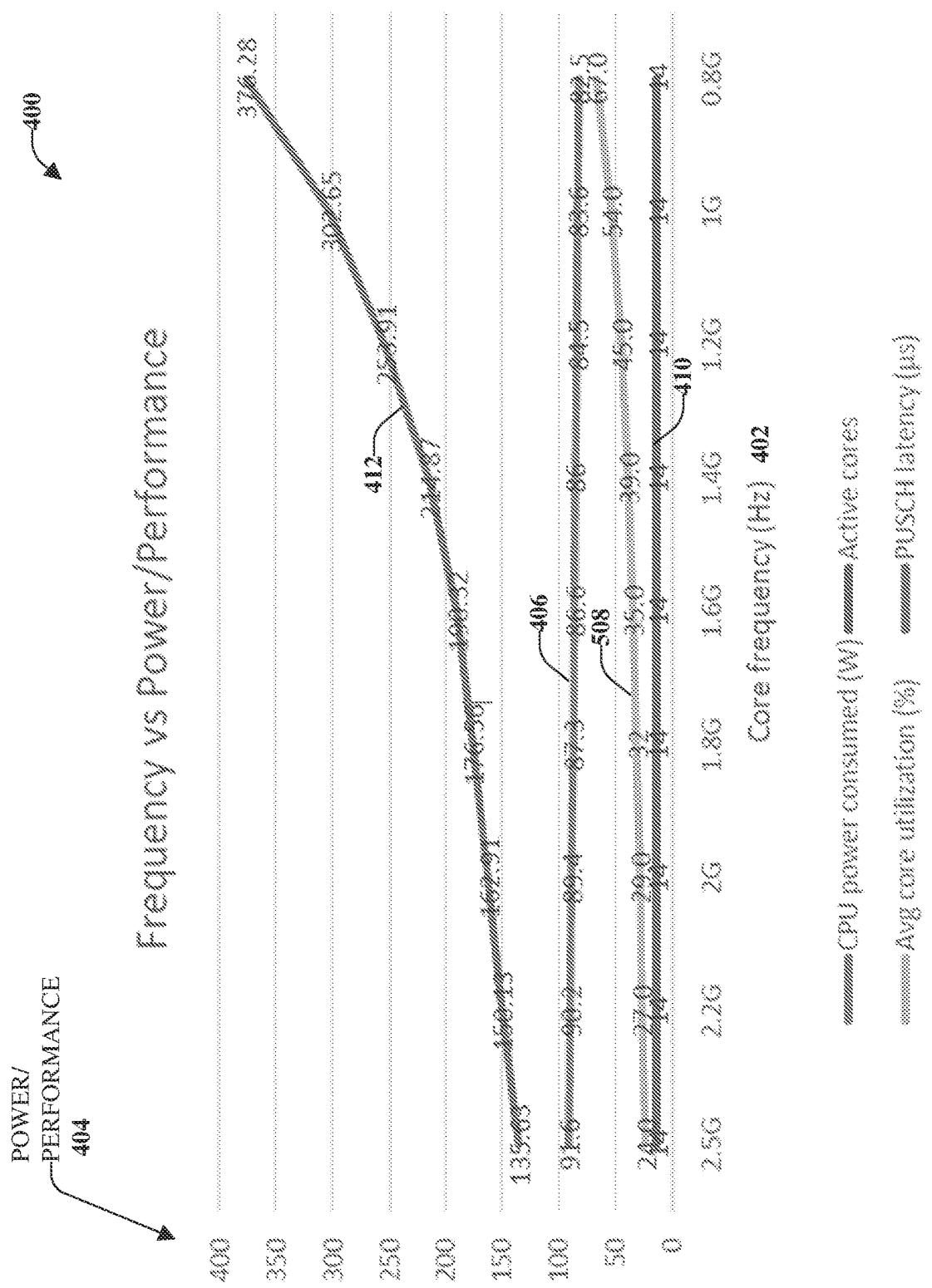
FIG. 4 illustrates an example, non-limiting, chart of FDD 20 MHz cells with fifty percent physical resource block utilization in accordance with one or more embodiments described herein.

FIG. 4 illustrates an example, non-limiting, chart 400 of FDD 20 MHz cells with 50% PRB utilization. Core frequency 402 (in Hz) is represented on the horizontal axis and power/performance 404 is represented on the vertical axis. FIG. 4 shows the plot with the load reduced by 50%. First line 406 represents the CPU power consumed (W), second line 408 represents the average core utilization (%), third line 410 represents the active cores, and fourth line 412 represents the PUSCH latency (μs).

From these figures (FIG. 3, FIG. 4), the CPU power consumed at full load when running at 2 GHz is about 94 W and 89.4 W at half load. However, if the CPU frequency is reduced to 1 GHz when 50% PRB are used, the CPU power is about 83.6 W, which is about 6.5% lower than the unscaled frequency. When the other core groups are also taken into account along with the power control state(s) activated, the overall power savings is significantly higher.

Benefits of the embodiments provided herein, including the scheduler enhancement, include, but are not limited to, the ability of power management to be applied at short durations during intermittent low activity any time of the day, and not only off-peak hours. Another benefit includes centralized control from within the scheduler that has a holistic view of the immediate activity of all the threads of the DU application. Yet another benefit is that with power management unified in the scheduler, it can also incorporate other mechanisms, such as symbol blanking and deferred scheduling, to put the cores into a longer sleep that can activate deeper power control states (e.g., a C6 state) to achieve further power savings. Still another benefit is that custom handling can be applied to different instances of the DU based on cell configuration and traffic profile. An additional benefit is that the disclosed embodiments can be applied to both lookaside and full-inline L1 acceleration. If L1 is running outside the host processor, it can still benefit from silicon-specific power saving procedures through the proposed Scheduler-L1 interface.

Novel aspects of the disclosed embodiments include, but are not limited to, inclusion of the server power management in the L2 scheduler to better utilize silicon-specific mechanisms for power savings. Other novel aspects include configuration of power saving profile derived using statistical models via the O1 interface and/or configuration of power saving profile derived using machine learning models via the E2 interface. Another novelty includes a look-up table-based profile definition for faster orchestration within the slot scheduling. Further, another novelty includes a common Scheduler-L1 interface for power control commands.

Figure 5:
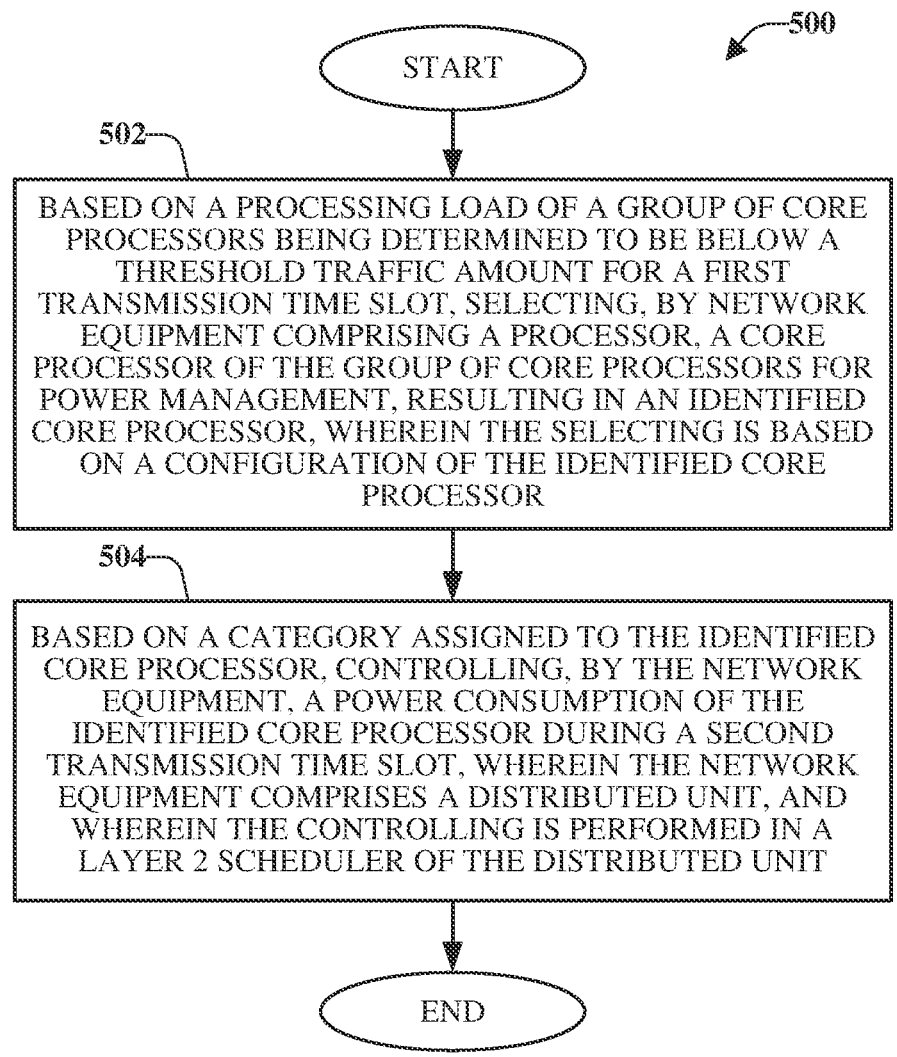
FIG. 5 illustrates a flow diagram of an example, non-limiting, computer-implemented method that facilitates a scheduler for distributed unit power management in accordance with one or more embodiments described herein.

FIG. 5 illustrates a flow diagram of an example, non-limiting, computer-implemented method 500 that facilitates a scheduler for distributed unit power management in accordance with one or more embodiments described herein. The computer-implemented method 500 and/or other methods discussed herein can be implemented by network equipment comprising a processor. According to another example, the computer-implemented method can be implemented by a system comprising a processor and a memory.

Based on a processing load of a group of core processors being determined to be below a threshold traffic amount for a first transmission time slot, the computer-implemented method 500 starts at 502, with selecting, by network equipment comprising a processor, a core processor of the group of core processors for power management, resulting in an identified core processor. The selection of the core processor can be based on a configuration of the identified core processor. The processing load of the group of core processors can change intermittently due to sporadic traffic patterns.

Further, based on a category assigned to the identified core processor, the computer-implemented method 500 includes controlling, by the network equipment, a power consumption of the identified core processor during a second transmission time slot, at 504. The network equipment comprises a distributed unit, and controlling the power consumption is performed in a layer 2 scheduler of the distributed unit.

The category assigned to the identified core processor is determined to be one from a defined group of categories, comprising: a first category associated with a polling layer 1 (PHY) protocol, a second category associated with a non-polling level 1 core, a third category associated with a polling level 2 core, and a fourth category associated with a non-polling level 2 core.

In some implementations, controlling the power consumption can include controlling a layer 2 core of the distributed unit. In some implementations, controlling the power consumption can include controlling a layer 1 core of the distributed unit. According to some implementations, controlling the power consumption can include controlling a layer 1 protocol of a computing entity separate from the core of the distributed unit. For example, the layer 1 protocol can be on a hardware block and/or another computing entity that is separate from the layer 1 core.

Controlling the power consumption can include, according to some implementations, changing a frequency of the identified core processor from a first frequency level to a second frequency level. For example, the second frequency level can be lower or higher than the first frequency level based on a comparison between a current load value and a previous load value. In accordance with some implementations, controlling the power consumption can include transitioning a mode of the identified core processor from an active mode to a sleep mode.

In accordance with some implementations, controlling the power consumption can include, at an end of scheduling for a transmission time slot and based on a processing load for the transmission time slot, determining a first state control parameter and a second state control parameter. Further, based on the determining of the parameters, respective threads are instructed to perform a power saving action for the identified core processor.

In accordance with some implementations, prior to controlling the power consumption at 504, the computer-implemented method 500 can include, based on use of a statistical model to implement the controlling, provisioning, by the network equipment, respective power management profiles for distributed unit instances of the identified core processor via an O1 interface. Further to these implementations, selection of the core processors at 502 is performed after the first transmission time slot and the computer-implemented method 500 includes determining, by the network equipment, a frequency assignment for a next scheduled slot following the first transmission time slot. Determining the frequency assignment is based on information obtained from a data structure that comprises a group of recommended frequencies based on the processing load.

In some implementations, prior to controlling the power consumption at 504, the computer-implemented method 500 can include provisioning, by the network equipment, respective power management profiles for distributed unit instances of the identified core processor via an E2 interface. Provisioning the respective power management profiles can be based on use of a machine learning model to implement the controlling. For example, the machine learning model can be trained based on historical data representative of past power management settings.

Figure 6:
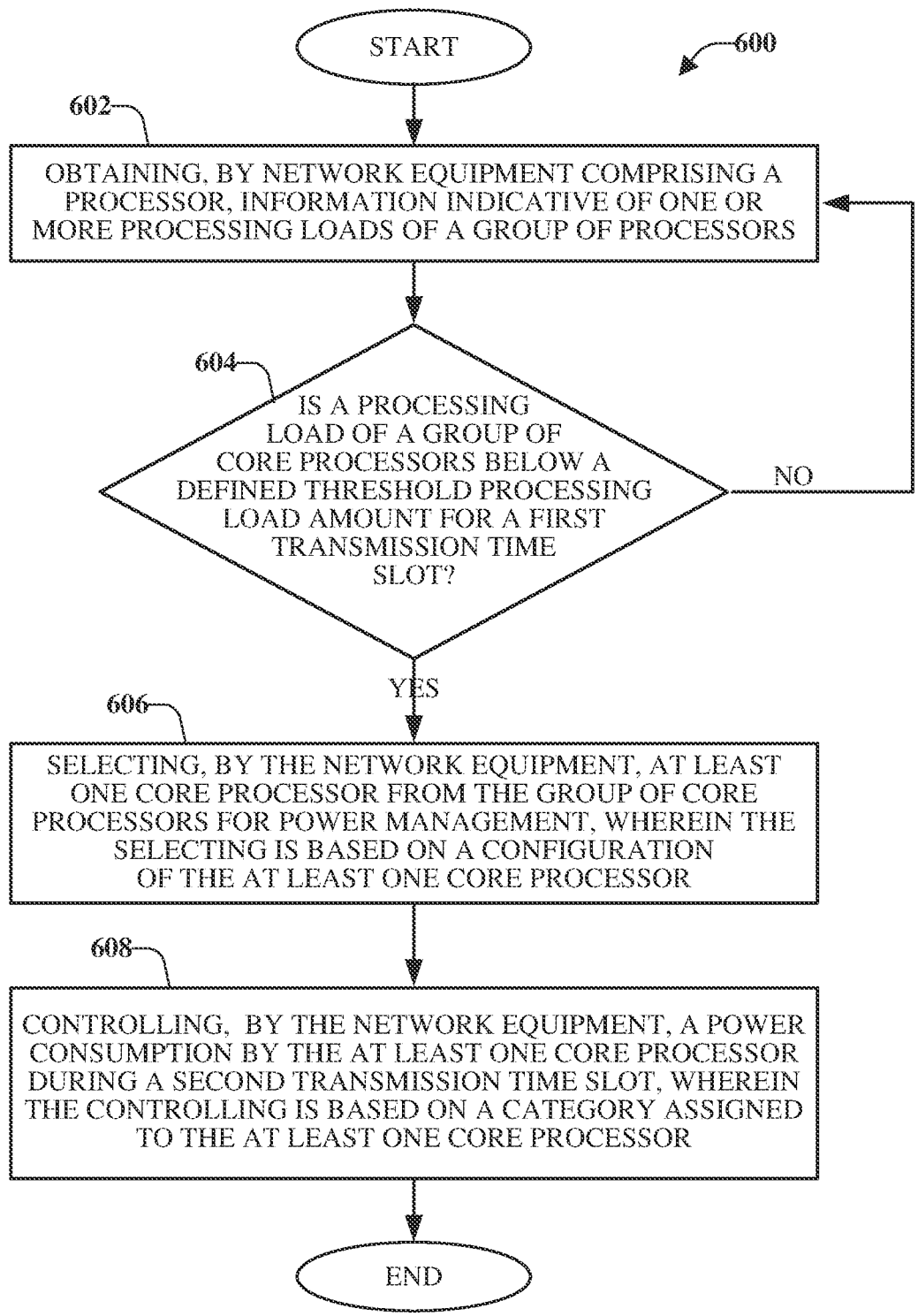
FIG. 6 illustrates a flow diagram of an example, non-limiting, computer-implemented method that facilitates power management in accordance with one or more embodiments described herein.

FIG. 6 illustrates a flow diagram of an example, non-limiting, computer-implemented method 600 that facilitates power management in accordance with one or more embodiments described herein. The computer-implemented method 600 and/or other methods discussed herein can be implemented by network equipment comprising a processor. According to another example, the computer-implemented method can be implemented by a system comprising a processor and a memory.

At 602, information indicative of one or more processing loads of groups of processors is obtained. A determination is made, at 604, whether a processing load of a group of core processors is below a defined threshold processing load amount for a first transmission time slot. If the determination is that the processing load is at or above the defined threshold ("NO"), the computer-implemented method 600 returns to 602.

Alternatively, if it is determined at 604 that the processing load is below the defined threshold processing load amount for the first transmission time ("YES"), at 606 at least one core processor is selected from the group of core processors for power management. The selection of the at least one core processor can be based on a configuration of the at least one core processor. For example, the configuration (or categories) of the core processors can include a polling level 1 core category, a non-polling level 1 core category, a polling level 2 core category, or a non-polling level 2 core category.

Further, at 608, power consumption by the at least one core processor is controlled during a second transmission time slot. Control of the power consumption can be based on a category assigned to the at least one core processor.

Control of the power consumption at 608 can include changing a frequency of the at least one core processor from a first frequency level to a second frequency level. The second frequency level can be lower or higher than the first frequency level depending on the current load as compared to the previous load.

In some implementations, control of the power consumption at 608 can include transitioning a mode of the at least one core processor from an active mode to a sleep mode. According to some implementations, control of the power consumption can be performed in a medium access control scheduler of a distributed unit. Control of the power consumption can include, in some implementations, controlling a layer 2 core of the distributed unit. In an additional or alternative implementation, control of the power consumption can include controlling a layer 1 protocol associated with a layer 1 core of the distributed unit.

In accordance with some implementations, the computer-implemented method 600 can include, prior to controlling the power consumption, provisioning respective power management profiles for distributed unit instances of the at least one core processor via an O1 interface. For example, provisioning of the respective power management profiles can be based on use of a statistical model to implement the controlling. Further to these implementations, the computer-implemented method 600 can include determining a frequency assignment for a next scheduled slot based on information obtained from a data structure that comprises a group of recommended frequencies based on the processing load, and a profile of the at least one core processor.

Figure 7:
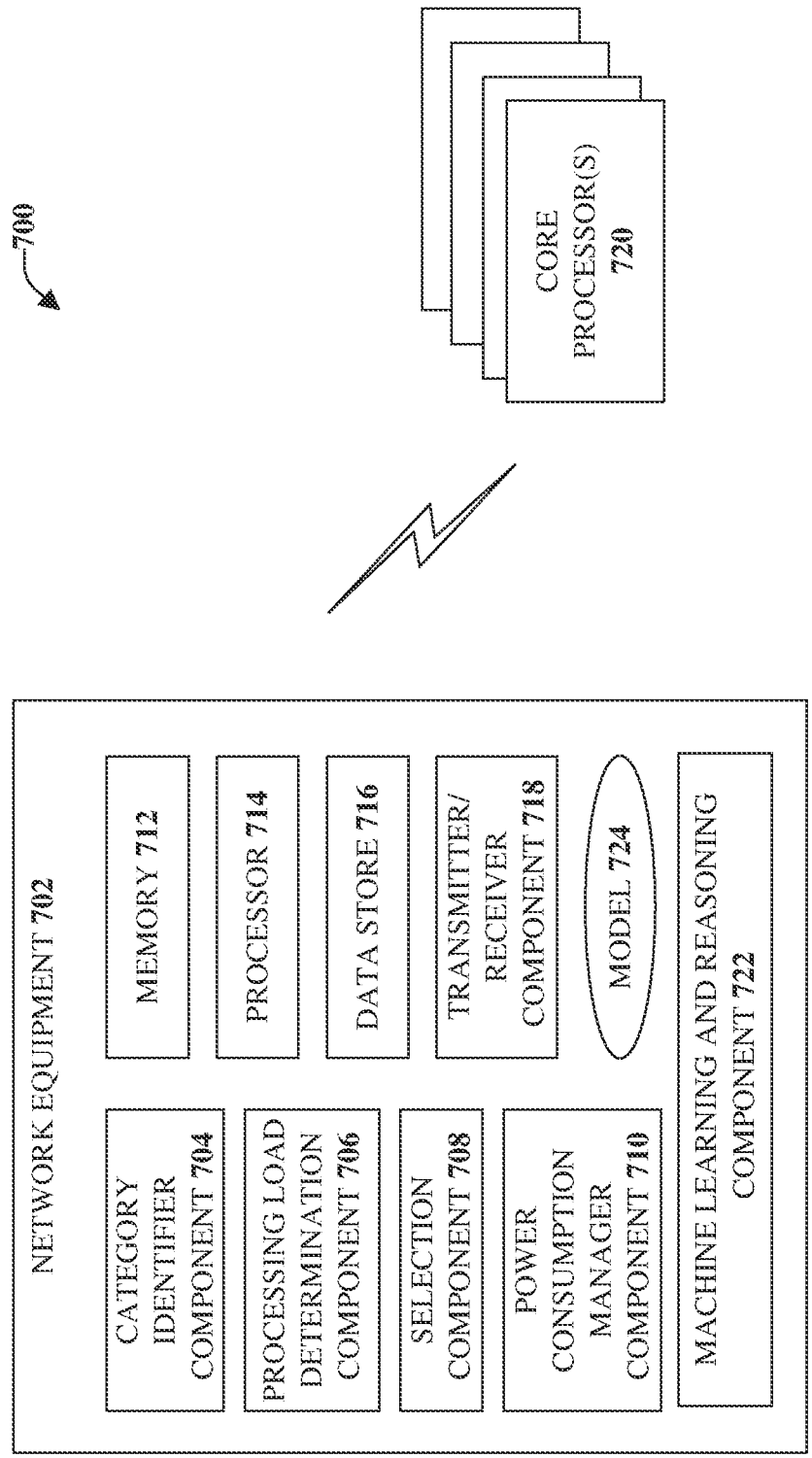
FIG. 7 illustrates an example, non-limiting, system that facilitates management of power consumption in accordance with one or more embodiments described herein.

FIG. 7 illustrates an example, non-limiting, system 700 that facilitates management of power consumption in accordance with one or more embodiments described herein. Repetitive description of like elements employed in other embodiments described herein is omitted for sake of brevity. The system 700 can comprise one or more of the components and/or functionality of the system 100 of FIG. 1, the computer-implemented method 500 of FIG. 5, the computer-implemented method 600 of FIG. 6, and vice versa.

Aspects of systems (e.g., the system 700 and the like), devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 700 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 700 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

The system 700 can include network equipment 702 that includes a category identifier component 704, a processing load determination component 706, a selection component 708, a power consumption manager component 710, at least one memory 712, at least one processor 714, at least one data store 716 (or at least one storage device), and a transmitter/receiver component 718. The at least one memory 712 can store computer executable components and instructions. The at least one processor 714 can facilitate execution of the instructions (e.g., computer executable components and corresponding instructions) by the category identifier component 704, the processing load determination component 706, the selection component 708, the power consumption manager component 710, the transmitter/receiver component 718, and/or other system components. As depicted, in some embodiments, one or more of the category identifier component 704, the processing load determination component 706, the selection component 708, the power consumption manager component 710, the at least one memory 712, the at least one processor 714, the at least one data store 716, and the transmitter/receiver component 718 can be electrically, communicatively, and/or operatively coupled to one another to perform one or more functions of the system 700.

The category identifier component 704 can determine respective categories associated with respective core processors of a group of core processors 720. The category determined by the category identifier component 704 can include, but is not limited to, a polling level 1 core category, a non-polling level 1 core category, a polling level 2 core category, or a non-polling level 2 core category.

The processing load determination component 706 can determine whether or not processing load of the group of core processors 720 is below a defined threshold processing load amount for a first transmission time slot. If the processing load is below the defined threshold processing load amount, the selection component 708 can select at least one core processor from the group of core processors 720 for power management. The selection by the selection component 708 can be based on a configuration of the selected core processor.

Further, the power consumption manager component 710 can control power consumption by the select core processor during a second transmission time slot. The control by the power consumption manager component 710 can be based on a category assigned to the selected core processor.

To control the power consumption, the power consumption manager component 710 changes a frequency of the selected core processor. For example, the frequency of the selected core processor can be reduced from a first frequency level to a second frequency level that has a lower frequency level than the first frequency level. In another example, the frequency of the selected core processor can be increased from a first frequency level to a second frequency level that has a higher frequency level than the first frequency level. According to another example, to control the power consumption, the power consumption manager component 710 transitions a mode of the selected core processor from an active mode to a sleep mode.

As illustrated, the network equipment 702 can comprise a machine learning and reasoning component 722 that can be utilized to automate one or more of the disclosed aspects based on training a model 724. The machine learning and reasoning component 722 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 722 can employ principles of probabilistic and decision theoretic inference. Additionally, or alternatively, the machine learning and reasoning component 722 can rely on predictive models (e.g., the model 724) constructed using machine learning and/or automated learning procedures. Logic-centric inference can also be employed separately or in conjunction with probabilistic methods.

The machine learning and reasoning component 722 can infer a configuration assigned (or that should be assigned) to core processors of a group of core processors and/or a category to which respective core processors of the group of core processors belong. The machine learning and reasoning component 722 can also infer which core processor (or more than one core processor) should be selected from a group of core processors for power consumption management. Based on this knowledge, the machine learning and reasoning component 722 can make an inference based on the type and amount of power consumption that should be applied.

As used herein, the term "inference" refers generally to the process of reasoning about or inferring states of a system, a component, a module, an environment, and/or equipment from a set of observations as captured through events, reports, data, and/or through other forms of communication. Inference can be employed to identify a manner of power consumption management for one or more core processors, including a duration of the power management, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with facilitating power consumption) can employ various artificial intelligence-based schemes for carrying out various aspects thereof. For example, a process for determining if a particular configuration for power management should be utilized can be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification can employ a probabilistic and/or statistical-based analysis (e.g., factoring into the analysis utilities and costs) to provide a prognosis and/or infer one or more actions that should be employed to determine a type, amount, and duration of power management to be automatically performed.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by obtaining current information, by obtaining historical information, by receiving extrinsic information, and so on). For example, SVMs can be configured through a learning or training phase within a classifier constructor and feature selection module. Thus, a classifier(s) can be used to automatically learn and perform a number of functions, including but not limited to determining, according to a predetermined criterion, which processing cores would benefit from power management, the type of power management to apply, and so forth.

Additionally, or alternatively, an implementation scheme (e.g., a rule, a policy, and so on) can be applied to control and/or regulate power management as discussed herein. In some implementations, based upon a predefined criterion, the rules-based implementation can automatically and/or dynamically apply power management procedures. In response thereto, the rule-based implementation can automatically interpret and carry out functions associated with power management by employing a predefined and/or programmed rule(s) based upon any desired criteria.

According to some implementations, seed data (e.g., a data set) can be utilized as initial input to the model 724 to facilitate the training of the model 724. In an example, if seed data is utilized, the seed data can be obtained from one or more historical data associated with power utilization and/or other information indicative of a configuration of processing cores. However, the disclosed embodiments are not limited to this implementation and seed data is not necessary to facilitate training of the model 724. Instead, the model 724 can be trained on new data received (e.g., via a feedback loop).

The data (e.g., seed data and/or new data, including feedback data) can be collected and, optionally, labeled with various metadata. For example, the data can be labeled with an indication of the category of core processor being utilized for communication, or other data, such as identification of respective equipment that provided one or more signals, a time the one or more signals were received, the content of the one or more signals, and so on.

The at least one memory 712 can be operatively connected to the at least one processor 714. The at least one memory 712 can store executable instructions and/or computer executable components and the at least one processor 714 can be utilized to execute the computer executable components stored in the at least one memory 712.

For example, the at least one memory 712 can store protocols associated with facilitating automatic power management procedures as discussed herein. Further, the at least one memory 712 can facilitate action to control communication between the network equipment 702, other network equipment, the one or more core processors 720, and/or other user equipment, such that the system 700 employs stored protocols and/or algorithms to achieve improved overall performance based on power management as described herein.

It should be appreciated that data stores (e.g., memories) components described herein can be either volatile memory or nonvolatile memory or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 714 can facilitate respective analysis of information related to facilitating power management. The at least one processor 714 can be a processor dedicated to analyzing and/or generating information received, a processor that controls one or more components of the system 700, and/or a processor that both analyzes and generates information received and controls one or more components of the system 700.

The transmitter/receiver component 718 can receive information and/or can return information indicative of power management and related configuration. The transmitter/receiver component 718 can be configured to transmit to, and/or receive data from, for example, one or more network equipment, one or more core processors, and/or one or more user equipment. Through the transmitter/receiver component 718, the system 700 can concurrently transmit and receive data, can transmit and receive data at different times, or combinations thereof.

Methods that can be implemented in accordance with the disclosed subject matter will be better appreciated with reference to the flow charts provided herein. While, for purposes of simplicity of explanation, the methods are shown and described as a series of flows and/or blocks, it is to be understood and appreciated that the disclosed aspects are not limited by the number or order of flows and/or blocks, as some flows and/or blocks can occur in different orders and/or at substantially the same time with other blocks from what is depicted and described herein. Moreover, not all illustrated flows and/or blocks are required to implement the disclosed methods. It is to be appreciated that the functionality associated with the flows and/or blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

As used herein, the term "storage device," "first storage device," "second storage device," "storage cluster nodes," "storage system," and the like (e.g., node device), can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within an object storage system, which are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 8:
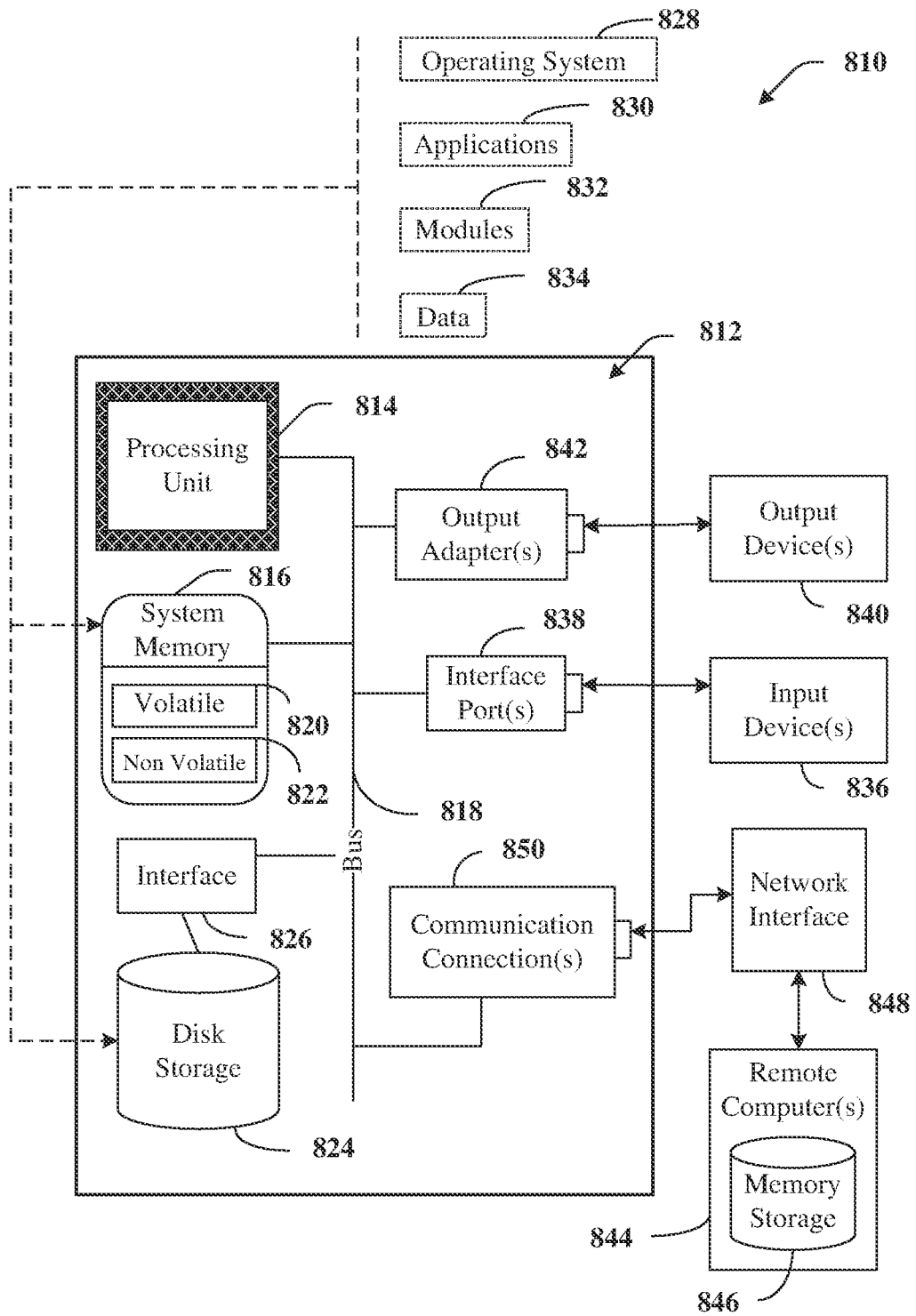
FIG. 8 illustrates an example, non-limiting, computing environment in which one or more embodiments described herein can be facilitated.

In order to provide a context for the various aspects of the disclosed subject matter, FIG. 8 as well as the following discussion are intended to provide a brief, general description of a suitable environment in which the various aspects of the disclosed subject matter can be implemented.

With reference to FIG. 8, an example environment 810 for implementing various aspects of the aforementioned subject matter comprises a computer 812. The computer 812 comprises a processing unit 814, a system memory 816, and a system bus 818. The system bus 818 couples system components including, but not limited to, the system memory 816 to the processing unit 814. The processing unit 814 can be any of various available processors. Multi-core microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 comprises volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can comprise read only memory (ROM), programmable ROM (PROM), electrically programmable ROM (EPROM), electrically erasable PROM (EEPROM), or flash memory. Volatile memory 820 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also comprises removable/non-removable, volatile/non-volatile computer storage media. FIG. 8 illustrates, for example a disk storage 824. Disk storage 824 comprises, but is not limited to, devices like a magnetic disk drive, floppy disk drive, tape drive, Jaz drive, Zip drive, LS-100 drive, flash memory card, or memory stick. In addition, disk storage 824 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 824 to the system bus 818, a removable or non-removable interface is typically used such as interface 826.

It is to be appreciated that FIG. 8 describes software that acts as an intermediary between users and the basic computer resources described in suitable operating environment 810. Such software comprises an operating system 828. Operating system 828, which can be stored on disk storage 824, acts to control and allocate resources of the computer 812. System applications 830 take advantage of the management of resources by operating system 828 through program modules 832 and program data 834 stored either in system memory 816 or on disk storage 824. It is to be appreciated that one or more embodiments of the subject disclosure can be implemented with various operating systems or combinations of operating systems.

A user enters commands or information into the computer 812 through input device(s) 836. Input devices 836 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 comprise, for example, a serial port, a parallel port, a game port, and a universal serial bus (USB). Output device(s) 840 can use some of the same type of ports as input device(s) 836. Thus, for example, a USB port can be used to provide input to computer 812, and to output information from computer 812 to an output device 840. Output adapters 842 are provided to illustrate that there are some output devices 840 like monitors, speakers, and printers, among other output devices 840, which require special adapters. The output adapters 842 comprise, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically comprises many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5, and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the system bus 818. While communication connection 850 is shown for illustrative clarity inside computer 812, it can also be external to computer 812. The hardware/software necessary for connection to the network interface 848 comprises, for exemplary purposes only, internal and external technologies such as, modems including regular telephone grade modems, cable modems and DSL modems, ISDN adapters, and Ethernet cards.

Figure 9:
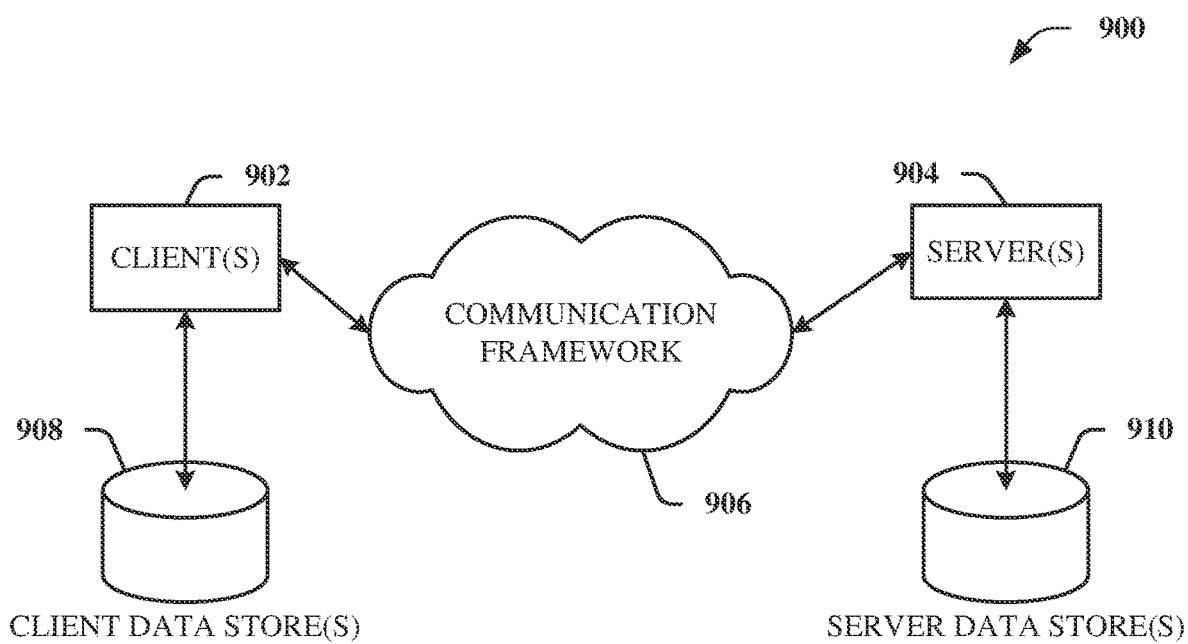
FIG. 9 illustrates an example, non-limiting, networking environment in which one or more embodiments described herein can be facilitated.

FIG. 9 is a schematic block diagram of a sample computing environment 900 with which the disclosed subject matter can interact. The sample computing environment 900 includes one or more client(s) 902. The client(s) 902 can be hardware and/or software (e.g., threads, processes, computing devices). The sample computing environment 900 also includes one or more server(s) 904. The server(s) 904 can also be hardware and/or software (e.g., threads, processes, computing devices). The servers 904 can house threads to perform transformations by employing one or more embodiments as described herein, for example. One possible communication between a client 902 and servers 904 can be in the form of a data packet adapted to be transmitted between two or more computer processes. The sample computing environment 900 includes a communication framework 906 that can be employed to facilitate communications between the client(s) 902 and the server(s) 904. The client(s) 902 are operably connected to one or more client data store(s) 908 that can be employed to store information local to the client(s) 902. Similarly, the server(s) 904 are operably connected to one or more server data store(s) 910 that can be employed to store information local to the servers 904.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. Yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, when the term "set" is used (e.g., "a set of carriers," "a set of cells," and so on), it means a non-zero set, "at least one", or "one or more." In a similar manner, when the term subset is used, it means a non-zero set, "at least one," or "one or more."

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    based on a processing load of a group of core processors being determined to be below a threshold traffic amount for a first transmission time slot, selecting, by network equipment comprising a processor, a core processor of the group of core processors for power management, resulting in an identified core processor, wherein the selecting is based on a configuration of the identified core processor; and
    based on a category assigned to the identified core processor, controlling, by the network equipment, a power consumption of the identified core processor during a second transmission time slot, wherein the network equipment comprises a distributed unit, and wherein the controlling is performed in a layer 2 scheduler of the distributed unit, wherein the category assigned to the identified core processor is determined to be one from a defined group of categories, comprising: a first category associated with a polling level 1 core, a second category associated with a non-polling level 1 core, a third category associated with a polling level 2 core, and a fourth category associated with a non-polling level 2 core.

2. The method of claim 1, wherein the controlling comprises controlling a layer 2 core of the distributed unit.

3. The method of claim 1, wherein the controlling comprises controlling a layer 1 core of the distributed unit.

4. The method of claim 1, wherein the controlling comprises controlling a layer 1 protocol of a computing entity separate from the core of the distributed unit.

5. The method of claim 1, wherein the controlling comprises transitioning a mode of the identified core processor from an active mode to a sleep mode.

6. The method of claim 1, wherein the controlling comprises:
    at an end of scheduling for a transmission time slot and based on a processing load for the transmission time slot, determining a first state control parameter and a second state control parameter; and
    based on the determining, instructing respective threads to perform a power saving action for the identified core processor.

7. The method of claim 1, further comprising:
    prior to the controlling and based on use of a statistical model to implement the controlling, provisioning, by the network equipment, respective power management profiles for distributed unit instances of the identified core processor via an O1 interface.

8. The method of claim 7, wherein the selecting is performed after the first transmission time slot, and wherein the method further comprises:
    based on information obtained from a data structure that comprises a group of recommended frequencies based on the processing load, and a profile of the identified core processor, determining, by the network equipment, a frequency assignment for a next scheduled slot following the first transmission time slot.

9. The method of claim 1, further comprising:
    prior to the controlling and based on use of a machine learning model to implement the controlling, provisioning, by the network equipment, respective power management profiles for distributed unit instances of the identified core processor via an E2 interface, wherein the machine learning model was trained based on historical data representative of past power management settings.

10. A system, comprising:
    a processor; and
    a memory that stores executable instructions that, when executed by the processor, facilitate performance of operations, comprising:
        determining that a processing load of a group of core processors is below a defined threshold processing load amount for a first transmission time slot;
        selecting at least one core processor from the group of core processors for power management, wherein the selecting is based on a configuration of the at least one core processor;
        determining a category assigned to the at least one core processor, wherein the determining of the category assigned to the at least one core processor comprises determining the category to be a polling level 1 core category, a non-polling level 1 core category, a polling level 2 core category, or a non-polling level 2 core category; and
        controlling power consumption by the at least one core processor during a second transmission time slot, wherein the controlling is based on the category assigned to the at least one core processor.

11. The system of claim 10, wherein the controlling is performed in a medium access control scheduler of a distributed unit.

12. The system of claim 11, wherein the controlling comprises controlling a layer 2 core of the distributed unit.

13. The system of claim 11, wherein the controlling comprises controlling a layer 1 protocol associated with a layer 1 core of the distributed unit.

14. The system of claim 10, wherein the operations further comprise:
prior to the controlling and based on use of a statistical model to implement the controlling, provisioning respective power management profiles for distributed unit instances of the at least one core processor via an O1 interface.

15. The system of claim 14, wherein the operations further comprise:
determining a frequency assignment for a next scheduled slot based on information obtained from a data structure that comprises a group of recommended frequencies based on the processing load, and a profile of the at least one core processor.

16. The system of claim 10, wherein the operations further comprise:
prior to the controlling and based on use of a machine learning model to implement the controlling, provisioning respective power management profiles for distributed unit instances of the at least one core processor via an E2 interface.

17. A non-transitory machine-readable medium, comprising executable instructions that, when executed by a processor of network equipment, facilitate performance of operations, the operations comprising:
based on a processing load of a group of core processors during a first time slot being determined to be below a threshold traffic amount, selecting a core processor of the group of core processors for power management, resulting in an identified core processor, wherein the selecting is based on a configuration of the identified core processor; and
based on a category assigned to the identified core processor, controlling, via a layer 2 scheduler of a distributed unit, a power consumption of the identified core processor during a second time slot, wherein the category assigned to the identified core processor is determined to be one from a defined group of categories, comprising: a first category associated with a polling level 1 core, a second category associated with a non-polling level 1 core, a third category associated with a polling level 2 core, and a fourth category associated with a non-polling level 2 core.

18. The non-transitory machine-readable medium of claim 17, wherein the controlling comprises controlling a layer 1 protocol associated with a layer 1 core of the distributed unit.

19. The non-transitory machine-readable medium of claim 17, wherein the selecting is performed after the first time slot, and wherein the operations further comprise:
based on information obtained from a data structure that comprises a group of recommended frequencies based on the processing load, and a profile of the identified core processor, determining a frequency assignment for a next scheduled time slot following the first time slot.

20. The non-transitory machine-readable medium of claim 17, wherein the operations further comprise:
prior to the controlling and based on use of a statistical model to implement the controlling, provisioning respective power management profiles for distributed unit instances of the at least one core processor via an O1 interface.

* * * * *